United States Patent [19]

Watanabe

[11] Patent Number: 4,843,536
[45] Date of Patent: Jun. 27, 1989

[54] AC INPUT FREE POWER SOURCE

[75] Inventor: Kenji Watanabe, Nara, Japan

[73] Assignee: Sharp Kabushiki Kaisha, Osaka, Japan

[21] Appl. No.: 3,841

[22] Filed: Jan. 16, 1987

[30] Foreign Application Priority Data

Jan. 17, 1986 [JP] Japan .................................. 61-8331

[51] Int. Cl.$^4$ ......................... H02M 7/04; G05F 5/00
[52] U.S. Cl. .................................... 363/89; 363/142; 363/143; 323/299
[58] Field of Search .................... 363/78–80, 363/86, 88, 89, 142, 143; 323/266, 271, 272, 299; 307/65, 75, 80

[56] References Cited

U.S. PATENT DOCUMENTS

| | | | |
|---|---|---|---|
| 3,260,920 | 7/1966 | Shoemaker | 363/89 |
| 3,460,023 | 8/1969 | Becker | 363/89 |
| 3,720,868 | 3/1973 | Lee | |
| 3,979,661 | 9/1976 | Matz | 363/89 |
| 4,675,801 | 6/1987 | Terada | 323/272 X |
| 4,733,158 | 3/1988 | Marchione et al. | 363/89 |

FOREIGN PATENT DOCUMENTS 0168183 6/1985 European Pat. Off. .

Primary Examiner—Peter S. Wong
Assistant Examiner—Emanuel Todd Voeltz
Attorney, Agent, or Firm—Birch, Stewart, Kolasch, & Birch

[57] ABSTRACT

There is disclosed an AC input free power source comprising a power transformer to receive an AC input, a rectifier to convert the AC input into a DC output, and a switching transistor so driven as to produce a stable current by the switching action thereof. In addition to the above, the present invention further includes a primary voltage detection circuit with the switching transistor used as a first switching transistor, wherein the voltage to be applied thereto is obtained substantially from the center of the secondary winding of the power transformer, while the AC input voltage is detected and a control signal is outputted in accordance with the value of the detected voltage. A switching input voltage changeover circuit having a second switching transistor and, in response to the control signal, changing the first and second switching transistors selectively for execution of the switching action.

4 Claims, 6 Drawing Sheets

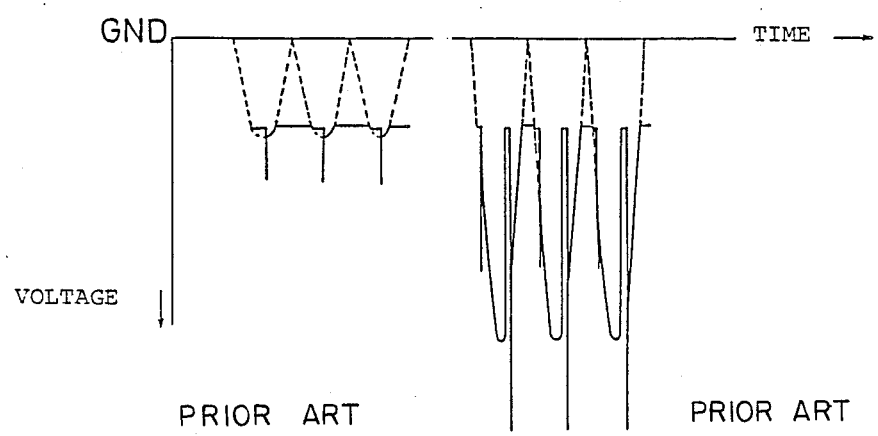
FIG. 6(a) PRIOR ART
FIG. 6(b) PRIOR ART
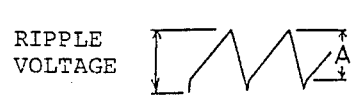
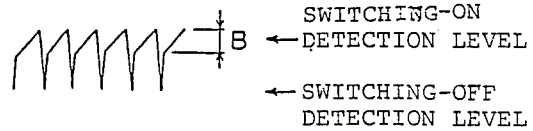
FIG. 6(c) PRIOR ART
FIG. 6(d) PRIOR ART

AC INPUT FREE POWER SOURCE

BACKGROUND OF THE INVENTION

1. Field of the Invention:

The present invention relates to an AC input free power source for use in an electronic apparatus or the like.

2. Description of the Prior Art

A conventional AC input free power source generally comprises, as shown in FIG. 5, a power transformer PT3, a rectifier BD2, a transistor Q6 for protecting an IC (integrated circuit), a switching transistor Q7, a zener diode ZD3 for protecting the switching transistor Q7, a smoothing capacitor C3, a resistor R12 for protecting the transistor Q6, a resistor R13 for limiting the start current of the transistor Q6, and another resistor R14 for controlling the drive current of the transistor Q6. A switching control switch (TRE) for the switching transistor Q7 is fed from the IC to a terminal 7, while a base potential control signal (R) for the transistor Q6 is fed from the IC to a terminal 9. A reference potential (GND) from a terminal 8 and a switching output voltage (VNG) from a terminal 10 are obtained respectively, and a dummy load R15 is connected to terminals 8a and 10a which correspond respectively to the aforesaid terminals 8 and 10.

In the known AC input free power source of such circuit configuration, the secondary output voltage of the power transformer PT3 naturally rises in accordance with an increase of the AC input voltage applied thereto. The input voltage to the AC input free power source ranges from rated 110 volts minus 15% to rated 240 volts plus 15%. The power transformer PT3 is so designed that a required minimum switching output voltage is obtained across the dummy load R15 when the AC input voltage is minimum. In the case when the AC input voltage is at a maximum value, the output voltage becomes about three times the minimum value. The number of on-off actions or the value of the switching frequency of the switching transistor Q7 is determined substantially by the aforementioned power transformer PT3, smoothing capacitor C3 and dummy load R15. It follows, therefore, that the switching frequency of the switching transistor Q7 varies in accordance with the AC input voltage applied to the power transformer PT3. The waveform of the rectified secondary voltage has a low peak value as shown in FIG. 6(a) when the AC input voltage is low, or has a high peak value as shown in FIG. 6(b) when the AC input voltage is high. Accordingly, in the case when the AC input voltage is high, the switching output voltage becomes a switching-off detection level with the capacitor C3 not being fully charged. Therefore the capacitor C3 is discharged in a short period of time, and the switching output voltage becomes a switching-on detection level. Thus, as shown in FIG. 6(d), the number of on-off switching actions repeated per unit time increases to be more than the number obtained in FIG. 6(c) where the AC input voltage is now. Denoted by A and B in FIG. 6(c) and (d) are the charge and discharge voltages of the capacitor C3.

Since the switching action is accompanied with an output loss, it is natural that the power loss increases in accordance with the rise of the switching frequency. Further, due to the high AC input voltage, an increase in the peak current from the power transformer PT3, occurs so that the power transformer PT3, the switching transistor Q7 and so forth are heated. For averting such a state, a great capacity is required to consequently bring about some problems including larger dimensions of the apparatus and a higher cost of its production.

SUMMARY OF THE INVENTION

The present invention has been accomplished in view of the above problems observed in the prior art. Its object resides in providing an AC input free power source which is so contrived as not to increase the switching frequency of a switching transistro despite any high AC input voltage and is capable of preventing power loss and generation of heat that may otherwise be caused by the increased switching frequency of the switching transistor, thereby realizing dimensional reduction of the apparatus and low production cost.

An AC input free power source is comprised of a power transformer to receive an AC input, a rectifier connected to the power transformer to convert the AC input into a DC output, and a switching transistor so driven as to produce a stable current by the switching action thereof. The present invention includes, for the purpose of achieving the object mentioned above, a primary voltage detection means with the said switching transistor used as a first switching transistor, wherein the voltage to be applied thereto is obtained substantially from the center of the secondary winding of the power transformer, while the AC input voltage is detected and a control signal is outputted in accordance with the value of the detected voltage, and a switching input voltage changeover means having a second switching transistor and, in response to the control signal, changing the first and second switching transistors selectively for executing the switching action. In the above constitution, the second switching transistor is selectively driven to execute its switching action when the AC input voltage is low, or the first switching transistor is selectively driven to excute its switching action when the AC input voltage is high, thereby averting an increase of the switching frequency to consequently minimize power loss and heat generation.

BRIEF DESCRIPTION OF THE DRAWINGS:

The present invention will become more fully understood from the detailed description given hereinbelow and the accompanying drawings which are given by way of illustration only, and thus are not limitative of the present invention and wherein:

FIG. 6(a) graphically shows the waveform of the rectified secondary voltage of a power transformer obtained when an AC input voltage is minimum;

FIG. 6(b) shows the waveform of the rectified secondary voltage of the power transformer obtained when the AC input voltage is maximum;

FIG. 6(c) shows the waveform of a VNG ripple voltage produced when the AC input voltage in FIG. 5 is minimum; and FIG. 6(d) shows the waveform of a VNG ripple voltage produced when the AC input voltage in FIG. 5 is maximum.

DESCRIPTION OF THE PREFERRED EMBODIMENTS

Hereinafter a first embodiment of the present invention will be described with reference to FIGS. 1 and 2.

Figure 1:
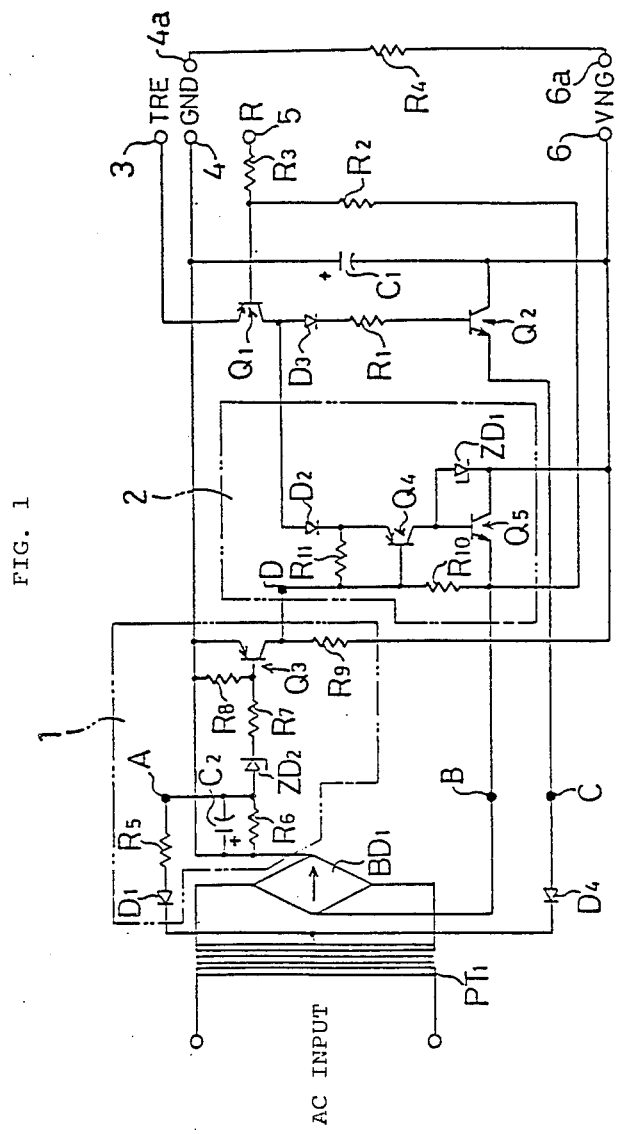
FIG. 1 is a circuit diagram showing a first embodiment of the present invention.
Figure 2:
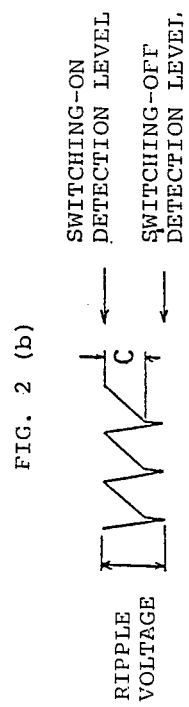
FIG. 2(a) graphically illustrates the relationship between a voltage waveform at point C in FIG. 1 and that in a conventional example.
FIG. 2(b) shows the waveform of a VNG ripple voltage.
Figure 2:
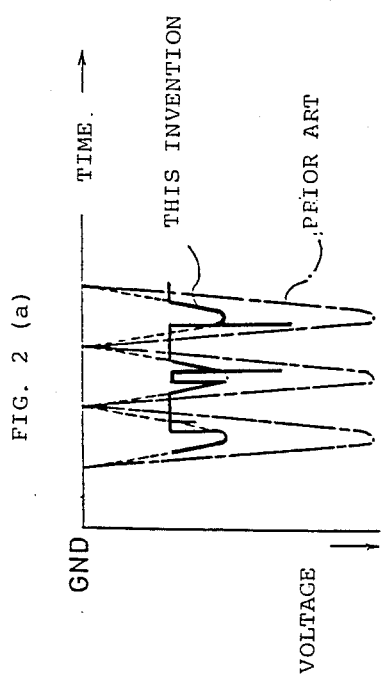

The AC input free power source according to the present invention comprises, as shown in FIG. 1, a power transformer PT1, a rectifier BD1, a primary voltage detection means 1, a switching input voltage changeover means 2, an IC (integrated circuit) protection transistor Q1, a first switching transistor Q2 for a high AC input, a smoothing capacitor C1, a resistor R1 for limiting the base current of the first switching transistor Q2 and also ensuring the base current of a second switching transistor Q5 in the switching input voltage changeover means 2, a resistor R2 for limiting the start current of the transistor Q1, a resistor R3 for limiting the drive current of the transistor Q1, a diode D3 for protecting the first switching transistor Q2, and a diode D4 through which the emitter of the first switching transistor Q2 is connected substantially to the center of the secondary winding of the power transformer PT1. The primary voltage detection means 1 comprises a rectifying diode D1, a smoothing capacitor C2, a charge limiting resistor R5 and a potential stabilizing resistor R6 for the smoothing capacitor C2, a primary voltage detecting zener diode ZD2, a primary voltage detection output transistor Q3, a base current limiting resistor R7 and a base potential control resistor R8 for the primary voltage detection output transistor Q3, and a collector potential clamping resistor R9 for the transistor Q3. The output power of the detection means 1 is obtained from the center of the secondary winding of the power transformer PT1 and the rectifier BD1. Meanwhile, the switching input voltage changeover means 2 comprises a second switching transistor Q5 for a low AC input, a zener diode ZD1 for protecting both the first switching transistor Q2 and the second switching transistor Q5, a diode D2 for protecting a transistor Q4 which controls the selective changeover of the first and second switching transistors Q2 and Q5, a resistor R10 for starting the transistor Q4, and a resistor R11 for stabilizing the on-off changeover operation. A switching control signal (hereinafter referred to as TRE) for the first and second switching transistors Q2 and Q5 is fed from the IC to a terminal 3, and a base potential control signal (R) for the transistor Q1 is fed from the IC to a terminal 5. A reference potential (hereinafter referred to as GND) is outputted from a terminal 4, and a switching output voltage (hereinafter referred to as VNG) is outputted from a terminal 6. A dummy load R4 is connected to terminal 4a and 6a which correspond respectively to the aforesaid terminals 4 and 6.

In the above constitution, the primary voltage detection means 1 detects the AC input voltage and feeds a control signal to the switching input voltage changeover means 2 in accordance with the value of the detected voltage. The capability of the primary voltage detection means 1 to discriminate between high and low values of the input voltage despite its connection to the secondary winding of the power transformer is based on the fact that the secondary voltage is proportional to a variation in the primary voltage. The AC input voltage is judged to be high or low by a comparison with the total voltage of the zener diode ZD2, the emitter-base voltage of the transistor Q3 and the voltage across the resistor R7. For example, when the AC input voltage is low, the potential at point A shown in FIG. 1 is lower than the above-mentioned total voltage. Accordingly, the base potential of the transistor Q3 is clamped by the resistor R8 to become approximately equal to the GND level. Then the transistor Q3 is turned off, so that potential at point D is clamped to the VNG and the potential at point is clamped by resistors R9 and R10 in the switching input voltage changeover means 2, whereby the base potential of the transistor Q4 is changed to its on-level and consequently an on-current is fed to the second switching transistor Q5 during a highlevel period of the TRF signal. In this stage the TRE signal is fed also to the first transistor Q2 via the diode D3 and the resistor R1, but the first transistor Q2 is not turned on since the potential at point C is about half the value at point B and the emitter voltage of the first switching transistor Q2 at point C is lower than VNG corresponding to the collector voltage. Therefore, when the AC input voltage is low, the second switching transistor Q5 in the switching input voltage changeover means 2 is driven in order to execute its switching action.

Meanwhile, when the AC input voltage is high, the potential at point A is higher than the aforesaid total voltage. Accordingly, a current comes to flow in the base of the transistor Q3 via the zener diode ZD2 and the resistor R7. Then the transistor Q3 is turned on, so that the potential at point D is changed to the GND level. Consequently, the base potential of the transistor Q4 is changed to its off-level and therefore the TRE signal is fed entirely to the first switching transistor Q2 without being introduced to the second switching transistor Q5. It follows that when the AC input voltage is high, the first switching transistor Q2 is driven to execute its switching action. Since the emitter of the first switching transistor Q2 is connected substantially to the center of the secondary winding of the power transformer PT1, about half the voltage at point B is applied to the emitter of the first switching transistor Q2. This is, a voltage of the waveform represented by a solid line in FIG. 2(a) is applied. Consequently, it becomes possible to avert an undesired phenomenon that VNG reaches a switching-off detection level with the capacitor C1 not being fully charged. Thus, as shown in FIG. 2(b), the switching frequency is not increased so much in comparison with the case of a low AC input voltage, hence power loss and heat generation are minimized in the switching transistors Q2, Q5 and the power transformer PT1. The charge-discharge voltage of the capacitor C1 is denoted by C in FIG. 2(b).

Figure 3:
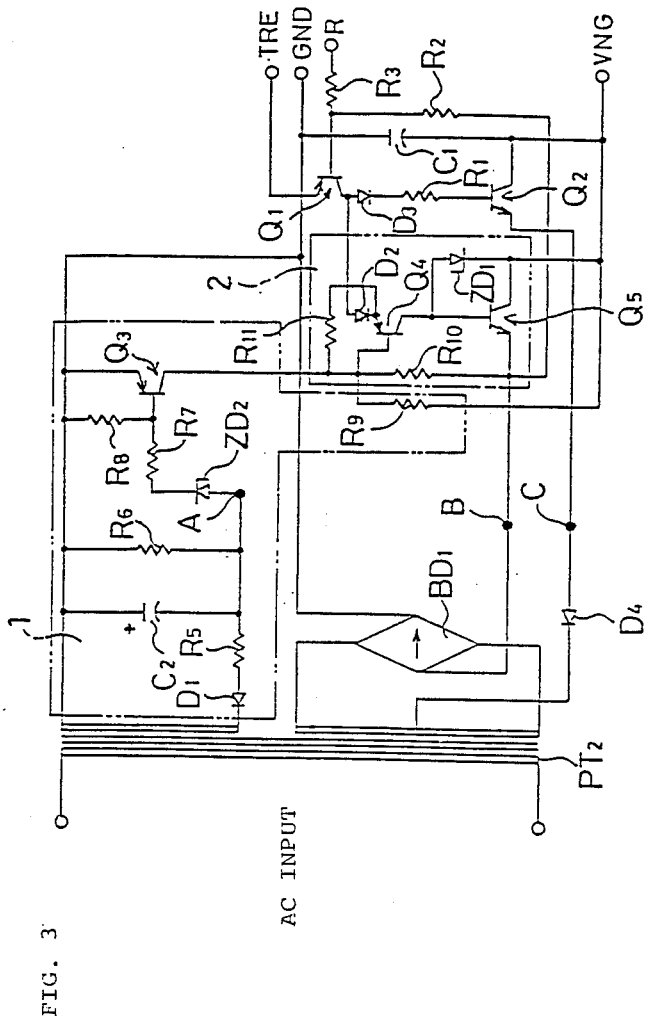
FIG. 3 is a circuit diagram showing a second embodiment of the invention.
Figure 4:
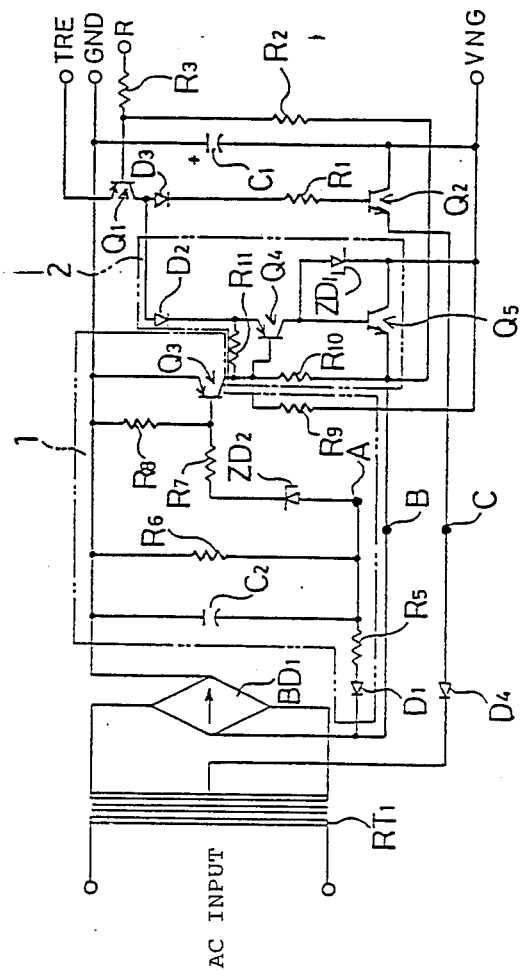
FIG. 4 is a circuit diagram showing a third embodiment of the invention.
Figure 5:
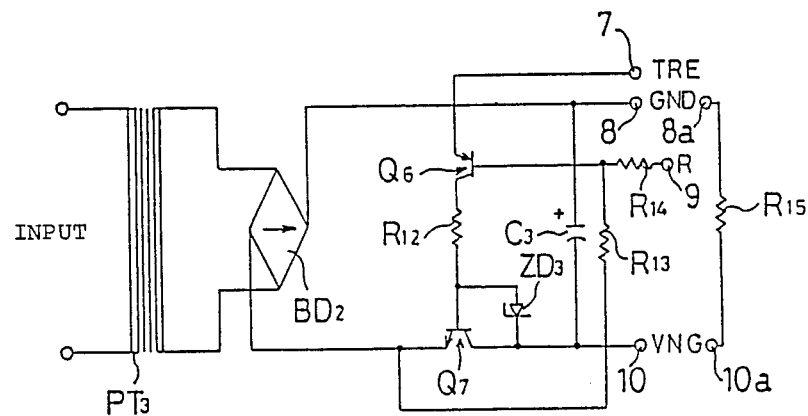
FIG. 5 is a circuit diagram of a conventional power source.

Now a second embodiment of the present invention will be described with reference to FIG. 3, wherein component that are functionally equal to those employed in the first embodiment are represented by the same reference numerals and symbols.

In this embodiment, a power transformer PT2 is equipped with two secondary windings, and a rectifier BD1 is connected to one of such windings. The emitter of a first switching transistor Q2 is connected substantially to the center of one secondary winding, while a primary voltage detection means 1 is connected to the other secondary winding. The constitution mentioned above maintains the same function as that of the first embodiment and enables free selection of the detection voltage in the primary voltage detection means 1.

Next a third embodiment, a primary voltage detection means 1 is connected to a rectifier BD1. This constitution has the same function as that of the first embodiment and is capable of narrowing the changeover voltage width in the switching input voltage changeover means 2 since the detection voltage in the primary voltage detection means 1 is high.

As described hereinabove, the AC input free power source of the present invention is equipped with a primary voltage detection means, a first switching transistor connected substantially to the center of the secondary winding of a power transformer, and a switching input voltage changeover means with a second switching transistor, wherein the first or second switching transistor is selectively actuated in accordance with the high or low value of the AC input voltage. Therefore, when the AC input voltage is high, the first switching transistor is driven to execute its switching action to avert an increase of the switching frequency, hence minimizing the power loss and heat generation in the switching transistor while realizing both dimensional and capacity reductions of the switching transistors, power transformer and so forth to consequently achieve low production cost.

While only certain embodiments of the present invention have been described, it will be apparent to those skilled in the art that various changes and modifications may be made therein without departing from the spirit and scope of the present invention as claimed.

What is claimed is:

1. An AC input free power source comprising:
   power transformer means for outputting an AC voltage;
   rectifier means connected to an output of said power transformer means for rectifying said AC voltage and outputting a DC voltage;
   primary voltage detection means for detecting the AC voltage, determining whether the AC voltage is above a predetermined voltage level or below said predetermined voltage level and outputting a control signal in accordance with the level of the AC voltage; and
   switching input voltage changeover means for producing a stable current to a load by selectively driving a first switching transistor means in response to said control signal being above said predetermined voltage level or a second switching transistor means in response to said control signal being below said predetermined voltage level;
   whereby, the switching frequency of said first switching transistor means or said second switching transistor means does not increase due to an increase in the AC voltage such that power loss and heat generation are minimized.

2. The AC input free power source as defined in claim 1, wherein said first switching transistor means is exclusively driven when said first logical level of the AC voltage is above said predetermined voltage level and said second switching transistor means is exclusively driven when the AC voltage is below said predetermined voltage level.

3. The AC input free power source as defined in claim 1, wherein said primary voltage detection means includes:
   Zener diode means for detecting whether the AC voltage at a center point of said power transformer means is above said predetermined voltage level or below said predetermined voltage level; and
   output transistor means for outputting the control signal.

4. The AC input free power source as defined in claim 3, wherein said switching input voltage chargeover means includes:
   changeover transistor means for selectively driving said first switching transistor means or said second switching transistor means.

* * * * *